United States Patent Office 2,915,515
Patented Dec. 1, 1959

2,915,515

POLYMERIZATION UTILIZING A CATALYST COMPRISING A METAL, A METAL HALIDE, AND A METAL OXIDE

Omar O. Juveland, South Holland, Herbert N. Friedlander, Homewood, and Edmund Field, Chicago, Ill., assignors to Standard Oil Company, Chicago, Ill., a corporation of Indiana No Drawing. Application May 29, 1958
Serial No. 738,654

12 Claims. (Cl. 260—94.9)

This invention relates to novel polymerization catalysts and polymerization processes. The present invention provides processes suitable for the homo- or heteropolymerization of ethylene. By the processes of the present invention, ethylene can be polymerized to yield normally solid materials of controlled high molecular weight, especially highly crystalline, resinous materials, e.g. materials having densities (24°/4° C.) in the range of about 0.94 to about 0.98.

Recently there have been disclosed a number of processes for polymerizing gaseous olefins to high molecular weight, normally solid polymers, employing as catalysts alkali metals or alkaline earth metals together with metal oxides of Groups 5a and/or 6a of the Mendeleeff Periodic Table, for example as described and claimed in U.S. Patents Nos. 2,691,647; 2,726,234 and 2,795,574. While such processes are effective for the production of desirable polymeric materials from gaseous olefins over a broad temperature range, it has been found that such catalytic processes are most effective at elevated temperatures preferably above 200° C., lower reaction temperatures resulting usually in a reduction in the rate of polymerization.

We have now found that substantially improved rates of polymerization of gaseous olefins to highly crystalline, resinous materials can be obtained with catalytic systems comprising alkali metals or alkaline earth metals together with metal oxides of group 5a and/or 6a and an effective amount of an aluminum halide. We have further found that ethylene can be readily polymerized in the presence of the novel catalysts of our invention at temperatures below the melting point of the polymeric product produced, thus providing the art with a novel suspension polymerization technique for the preparation of high molecular weight ethylene polymers.

An object of our invention therefore, is to provide means for the preparation of novel olefin polymerization catalysts in situ from economical compounds of commerce. Another object is to provide the polymerization art with new cheap polymerization catalysts and methods for the preparation thereof. Yet another object is to provide novel suspension polymerization processes capable of polymerizing ethylene at low temperatures and pressures to highly crystalline polymers of high molecular weight. These and other objects will become apparent from the following description of our invention.

In accordance with our invention, ethylene and the like can be polymerized readily under relatively mild operating conditions to produce commercially desirable solid polymers by contact with catalysts prepared by mixing the following components in an inert liquid medium:

(a) A metal selected from the group consisting of alkali metals and alkaline earth metals.

(b) An aluminum halide.

(c) At least one metal oxide selected from the group consisting of oxides of transition metals of sub-groups 5a and 6a of the Mendeleeff Periodic Table.

The alkali metals are Li, Na, K, Rb and Cs of which the first three are sufficiently economical to warrant current commercial consideration. The alkaline earth metals are Be, Mg, Ca, Sr, and Ba. The alkali and/or alkaline earth metals may be employed in the finely divided form, e.g. as dispersions, as powder, or as turnings and the like having a relatively high surface area per unit of volume. Mixtures of metals, or alloys of the desired metal, for example magnesium-aluminum alloy, containing a major proportion of magnesium can be employed as the source of the metal.

The aluminum halide employed as a catalyst component can be an aluminum trihalide of a single halogen element, e.g. $AlCl_3$, $AlBr_3$ and the like, or an aluminum trihalide containing diverse halogen atoms, e.g. aluminum chlorobromides and the like. The aluminum halide can be used in the form of a double salt, a wide variety of which are known, including for example double salts of aluminum chloride and ammonium chloride, aluminum chloride and other metal chlorides such as sodium chloride, potassium chloride, calcium chloride, and the like. We prefer to use $AlCl_3$ because it is readily available, cheap and effective. The inert liquid medium used in our invention is usually a saturated or aromatic hydrocarbon which is a liquid under the polymerization conditions.

The metal oxide catalyst ingredients employed in the present invention are those of metals of Group 5a and/or Group 6a (transition series members) of the Mendeleeff Periodic Table, viz. V, Nb, Ta, Cr, Mo, W, U or mixtures thereof. The metal oxides are preferably extended upon suitable supports such as difficultly reducible metal oxides including silica, activated alumina, titania, zirconia, clays and the like. The supported oxides are preferably calcined in air at temperatures between about 250° and about 700° C. before use to minimize the concentration of water and hydroxy groups in the catalysts and/or supports.

The proportion of group 5a and/or 6a metal oxide catalyst (including the catalyst support) with respect to the olefin charging stock, may vary from about 0.001 to about 20 wt. percent, being not usually a critical feature of our process. The alkali metal or alkaline earth metal is supplied in an amount of at least one chemical equivalent per mole of aluminum halide employed in the reaction mixture, and preferably in an amount of at least one chemical equivalent per chemical equivalent of aluminum halide. Larger proportions of alkali or alkaline earth metal may be used, for example up to about 10 equivalents thereof per equivalent of aluminum halide, or even more. The number of chemical equivalents of any component is the number of moles of said component times the positive valence of the metallic element in said component. In general the weight ratio of the sum of alkali metal or alkaline earth metal and aluminum halide to the metal oxide catalyst (including the catalyst support) is from about 0.01 to about 5.0, preferably from about 0.1 to about 1.0.

The group 5a and/or 6a metal oxides are extended upon suitable supports and can be at least partially prereduced before use and preferably before contact with the other catalyst components by use of various reducing agents such as hydrogen, dehydrogenatable hydrocarbons, CO, $H_2S$ or their equivalents. Mixed oxides or complex oxygen compounds of group 5a or 6a metals can also be employed in the present process. Thus, in addition to the group 5a and/or 6a metal oxide, the catalysts can comprise oxides of sodium, copper, tin, zinc, nickel, cobalt, titanium, zirconium, manganese, thorium, etc. Mixed metal oxide catalysts can readily be prepared by calcining the desired metal salts of oxy acids of group 5a and/or 6a metals, wherein the group 5a and/or 6a metal appears in the anion, for example, salts of metavanadic acid, molybdic acid and the like, ammonium metavanadate, sodium vanadate or the like.

The group 5a and/or 6a metal oxide is extended upon suitable supports (having surface areas, for example, between about 1 and about 1500 square meters per gram), for example difficulty reducible metal oxides such as activated alumina, magnesia, titania, zirconia, silica or their composites e.g. synthetic aluminosilicates, clays and the like. In some instances it may be desired to employ a relatively low surface area support, of which a variety are known in the art, including tabular alumina, various fused silicates, silicon carbide, diatomaceous earths; various metals, preferably treated to produce a relatively thin surface coating of the corresponding metal oxide thereon, such as iron or steel containing a slight iron oxide coating, or aluminum carrying a surface coating of alumina, e.g. as an anodized aluminum. We may also employ relatively high surface area, relatively non-porous supports or carriers for the group 5a and/or 6a metal oxide such as kaolin, zirconium oxide, iron oxide, pigments, carbon black and the like.

The relative proportion of support to the catalytic metal oxide is not critical and can be varied throughout a relatively wide range starting upward from 1 part per 100. The usual catalytic metal oxide to support ratios, by weight, are usually selected in the range of about 1:20 to 1:1 or approximately 1:10. We may employ metal oxide catalysts composed of a supporting material containing about 1 to 80%, preferably about 5 to 35% or approximately 10% of vanadia or molybdena or other group 5a and/or 6a catalytic metal oxide supported thereon.

The group 5a or 6a metal oxide can be incorporated in the catalyst support in any known manner, for example, by impregnation, co-precipitation, co-gelling and/or absorption techniques which are well known in the catalyst art. It may be desired to confine the metal oxide almost completely to a surface film on the support, rather than to achieve deep impregnation of the support with metal oxide catalyst, in order to minimize mechanical disintegration of the catalyst by solid polymer.

In order to maximize the catalyst activity and reduce the requirements of alkali metal or alkaline earth metal co-catalyst, it is preferable to effect partial reduction of catalysts comprising group 5a metal pentoxides or hexavalent group 6a metal oxides before use in the polymerization process. The partial reduction and conditioning treatment of the solid metal oxide catalysts is preferably effected with hydrogen although other reducing agents such as carbon monoxide, mixtures of hydrogen and carbon monoxide (water gas, synthesis gas, etc.), sulfur dioxide, hydrogen sulfide, dehydrogenatable hydrocarbons, etc. may be employed. Hydrogen can be employed as a reducing agent at temperatures between about 350° C. and about 850° C., although it is more often employed at temperatures within the range of 450° C. to 650° C. The hydrogen partial pressure in the reduction or conditioning operation can be varied from sub-atmospheric pressures for example even 0.1 pound (absolute) to relatively high pressures up to 3000 p.s.i.g., or even more. The simplest reducing operation can be effected with hydrogen at atmospheric pressure.

The proportion of group 5a and/or 6a metal oxide catalyst (including the support) based on the weight of the mono-olefinic charging stock, can range upwardly from about 0.001 weight percent to 20 weight percent or even more. In a polymerization operation carried out with a fixed bed of catalyst, the catalyst concentration relative to olefin can be very much higher. The efficiency of the supported group 5a or 6a metal oxide catalysts is extremely high in the presence of the alkali metal or alkaline earth metal and aluminum halide co-catalysts, so that said metal oxide catalysts can be employed in very small proportions, based on the weight of charging stock, for example, between about 0.01 and about 10 weight percent, while maintaining high conversion efficiency.

The mixture of catalyst components is allowed to interact in the inert liquid medium at a temperature between about 20° C. and about 250° C. (preferably about 30° C. to about 175° C.) under an inert gas blanket or in the presence of the olefin to be polymerized. The promoting action of the alkali metal or alkaline earth metal and aluminium halide co-catalysts may be enhanced if they are pre-reacted with the solid catalyst prior to admission of the olefin. Pre-reaction where desirable is carried out in the absence of olefin for from about 0.5 to about 4 hours, preferably 1 hour at room temperature to 150° C. The catalyst components can be allowed to interact in the presence of various stabliizing agents other than the olefin to be polymerized, e.g. other olefinic hydrocarbons, especially conjugated dienes such as butadiene, isoprene, styrene, indene and the like.

The total concentration of catalytic ingredients in the inert liquid medium is generally at least about 2 g. per 100 ml. and usually up to about 20 g. or even more per 100 ml.

The polymerization process of our invention can be effected over the temperature range of about 20° C. to about 250° C., but generally we use temperatures in the range of about 30° C. to about 175° C., and preferably in the range of about 50° to about 150° C. In a preferred embodiment, the polymerization is effected at a temperature below the melting point of the polymer produced, that is below about 125° C., the process then being effectively a suspension polymerization process wherein the polymer precipitates from the reaction mixture as it is formed. By operating in this manner, crystalline polymeric products of extraordinary high molecular weight are readily obtained.

The polymerization pressure can be varied from less than one atmosphere e.g. ½ atmosphere to very high pressure of the order of 10,000 p.s.i.g., 15,000 p.s.i.g. or even more. The polymerization pressure can conveniently be set at about 1 to about 1000 p.s.i.g.

It is desirable to minimize or avoid the introduction of water, oxygen, carbon dioxide, acetylene or sulfur compounds into contact with the catalyst ingredients. Any known means may be employed to purify the olefinic charging stocks of these materials prior to their introduction into the polymerization reactor.

The contact time or space velocity employed in the polymerization process will be selected with reference to the other process variables, catalysts, specific type of product desired and the extent of olefin conversion desired in any given run or pass over the catalyst. In general, this variable is readily adjustable to obtain the desired results. In operations in which the ethylene containing charging stock is caused to flow continuously into and out of contact with the catalyst, suitable liquid hourly space velocities are usually between about 0.1 and about 10 volumes, preferably about 0.5 to 5 or about 2 volumes of olefin solution in an inert liquid reaction medium per volume of solid catalyst. The amount of olefin in such solutions may be in the range of about 2 to 50% by weight, preferably about 2 to about 15 weight percent, or for example, about 5 to 10 weight percent.

The following specific examples are introduced as illustrations of our invention and should not be construed as an undue limitation thereof. The ethylene employed in the polymerization reactions was a commercial product containing oxygen in the range of about 15 to 50 p.p.m. The n-heptane employed as an inert solvent was a commercial product thoroughly dried before use. Intrinsic viscosities were determined at 130° C. on solutions of polymer sample in 100 cc. of n-decalin containing 0.05 g. Ionol (2,6-di-tert-butyl-4-methylphenol) as stabilizer.

*Example 1*

A 300 cc. rocker bomb was charged with 2.9 g. of a composition of 5.7 wt. percent $V_2O_5$ supported on activated silica (previously calcined for 2 hours at 450° C. in oxygen and cooled under nitrogen before use), 70 cc. of dry mineral spirits, 4.1 g. of Na metal dispersed in 7 cc. of xylene and 4.8 g. of aluminum chloride. Ethylene was charged to the bomb to a pressure of 590 p.s.i.g., and the bomb contents agitated and heated to a temperature of 82° C. The reaction was maintained at this temperature for 22½ hours. During the course of the reaction, the pressure intermittently dropped to 300 p.s.i.g., as the ethylene reacted, and ethylene was periodically pressured into the reactor to a pressure of 900 p.s.i.g. The reactor was then cooled to room temperature, the contents discharged and filtered, and the solids so obtained washed with methanolic HCl in a Waring Blendor, filtered, washed with acetone and dried at 85° C. There was obtained 41 g. of solid polyethylene, having an intrinsic viscosity of 7.1 dl./g. and a density (24°/4° C.) of 0.9833.

Following the procedure described above, a series of runs were conducted using the same reactant quantities, except that the temperature of polymerization was varied. The following results were obtained.

| Reaction Temperature, ° C. | Yield, Solid Polyethylene, g. | Intrinsic Viscosity, dl./g. |
| --- | --- | --- |
| 150 | 31 | 5.60 |
| 205 | 10.2 | |

In the absence of aluminum chloride, operating in accordance with the above procedure at 82° C. for 70 hours, no solid polymer was produced.

*Example 2*

A 190 cc. rocker bomb was charged with 10.0 g. of a composition of 8.0 wt. percent $MoO_3$ supported on activated alumina previously calcined at 400° to 600° C. for 48 hours, 100 cc. of dry n-heptane, 1.28 g. of sodium metal and 0.74 g. of aluminum chloride. Ethylene was charged to the bomb and the contents of the bomb agitated and heated to a temperature of 250° C. The reaction was maintained at this temperature and a pressure of 900–1000 p.s.i.g. for 3 hours. The reactor was then cooled and the contents discharged and filtered. The solids so obtained were washed with methanolic HCl in a Waring Blendor, then filtered, washed with acetone and dried at 85° C. The solid polymer was extracted with xylene. It was found that 2.5 g. of solid polymer essentially insoluble in boiling xylenes had been formed. It was further found that none of the ethylene had been converted to normally gaseous or normally liquid products. The solid product had a melt viscosity of $5.1 \times 10^6$ poises at 145° C. (method of Dienes and Klemm, J. Appl. Phy. 17, 458 (1946), and a density (24°/4° C.) of 0.9668.

Following the procedure described above, a second run was conducted using the same reactants except that no aluminum chloride was employed. Only a trace of solid polymer was obtained, accompanied by 1.0 g. of gummy material.

*Example 3*

A 300 cc. rocker bomb was charged with 70 cc. dry n-heptane, 2.9 g. aluminum chloride, 3.3 g. magnesium turnings and 3.06 g. of a composition of 7.5 wt. percent vanadia ($V_2O_5$) on silica, the latter calcined before use at 450° C. for 2 hours. Hydrogen was pressured into the bomb to a pressure of 125 p.s.i.g., followed by sufficient ethylene to obtain a pressure of 310 p.s.i.g. at room temperature. The bomb contents were agitated and heated to 82° C. in about ¾ hour. Ethylene pressure was then maintained at 500–800 p.s.i.g. for 22 hours at 82° C. Solid polyethylene weighing 2.7 g. was obtained, having an intrinsic viscosity of 1.48 dl./g. and a density (24°/4° C.) of 0.9717.

In the absence of aluminum chloride, using the same reactants and conditions as above, no solid polyethylene was obtained.

*Example 4*

Following the procedure of Example 3, a 300 cc. rocker bomb was charged with 70 cc. of mineral spirits, 3.2 g. magnesium powder, 6.4 g. aluminum bromide and 3.9 g. of a composition of 8.2 wt. percent $CrO_3$ supported on activated silica previously calcined for 1 hour at 450° C. Ethylene was pressured in to 450 p.s.i.g. and the bomb heated to 82° C. Operation at 300–900 p.s.i.g. for 21½ hours yielded 1.1 g. of solid polyethylene.

*Example 5*

Following the procedure of Example 1, a 300 cc. rocker bomb was charged with 1.25 g. of lithium metal as a dispersion in 11 cc. of white oil, 4.8 g. aluminum chloride, 70 cc. of dry n-heptane and 3.0 g. of a composition of 8.7 wt. percent molybdenum oxide ($MoO_3$) on alumina. The molybdena-alumina was reduced at atmospheric pressure with hydrogen gas at 500° C. for 4 hours before use. Ethylene pressure was maintained at 400–800 p.s.i.g. for 9 hours, the temperature of the bomb being 82° C. A total of 65 g. of solid polyethylene was recovered from the reactor contents, having an intrinsic viscosity of 10.08 dl./g. and density (24°/4° C.) of 0.9355.

Although the novel catalysts and polymerization processes of the present invention have been generally described and specifically illustrated above, it will be appreciated that the invention is capable of very substantial extension therefrom.

Various monomers can be polymerized with ethylene and may be present in the reaction mixture in concentrations up to about 30 to 40 mole percent, based on ethylene.

Vinyl alkene monomers which may be copolymerized with ethylene by the present polymerization process have the generic formula $RCH=CH_2$ wherein R is an alkyl radical. Specifically, suitable vinyl alkene feedstocks comprise propylene, isobutylene, 1-butene, 1-pentene, 3-methyl-1-butene, 1-hexene, t-butylethylene, tetrafluoroethylene, and mixtures of one or more of these alkenes or the like.

The process of the present invention can also be applied to mixtures of ethylene with polyolefinic hydrocarbons, especially conjugated alkadienes e.g., 1,3-butadiene, isoprene, piperylene, 4-methyl-1,3-pentadiene or to non-conjugated alkadienes such as 1,5-hexadiene or the like.

Vinyl arenes are suitable feedstocks for use as comonomers with ethylene. Examples of vinyl arenes are styrene, nuclearly alkylated (especially methylated) styrenes, nuclearly halogenated styrenes, p-divinylbenzene and the like.

Polymerization is preferably performed in the presence of various reaction media which are liquid under the selected polymerization conditions of temperature and pressure. We prefer to employ relatively inert liquid reaction media such as saturated hydrocarbons (alkanes and cycloalkanes), aromatic hydrocarbons, relatively unreactive alkenes or cycloalkenes, perfluorocarbons, chloroaromatics or mixtures of suitable liquids, e.g., as described in United States Patent 2,692,257 of Alex Zletz.

The polymeric products produced by the processes encompassed within the scope of our invention can be subjected to a variety of treatments, designed to remove all or part of the catalytic materials therefrom.

Thus the hot polymeric solutions can be filtered for removal of solid catalyst, the filtrate cooled and the precipitated polymer recovered by further filtration, centrifugation or the like. Alternatively the hot polymeric solutions can be cooled to ambient temperatures, the precipitated polymer containing solid catalysts separated and the polymer recovered by solvent extraction from the solid catalysts employed in the polymerization operation. Where polymerization is effected at lower temperatures within the indicated range, e.g. below about 125° C., the polymer will precipitate from solution as it is formed, and can be filtered and similarly extracted from the solid catalyst. The extracted polymer can be washed with water, methanol, alcoholic solutions of mineral acid, e.g. methanolic HCl or the like to remove traces of residual catalytic materials. Hot acetic acid extraction of ash from the polymers may also be practiced.

The polymers produced by the process of this invention can be subjected to such after-treatment as may be desired to fit them for particular uses or to impart desired properties. Thus, the polymers can be extruded, mechanically milled, filmed or cast, or converted to sponges or latices. Antioxidants, stabilizers, fillers, extenders, plasticizers, pigments, insecticides, fungicides, etc. may be incorporated in the polyethylenes. The polyethylenes may be employed as coating materials, gas barriers, binders, etc. to even a wider extent than polyethylenes made by prior processes.

The polymers produced by the process of the present invention, especially the polymers having high specific viscosities, can be blended with other polyethylenes or polypropylenes to impart stiffness or flexibility or other desired properties thereto. The solid resinous products produced by the process of the present invention can likewise be blended in any desired proportions with hydrocarbon oils, waxes, such as paraffin or petrolatum waxes, with ester waxes, with high molecular weight polybutenes and with other organic materials. Small proportions between 0.1 and about 1 percent of the various polymers produced by the process of the present invention can be dissolved or dispersed in hydrocarbon lubricating oils to increase V.I. and to decrease oil consumption when the compounded oils are employed in motors. The polymerization products having molecular weights of 50,000 or more, provided by the present invention, can be employed in small proportions to increase the viscosity of fluid liquid hydrocarbon oils and as gelling agents for such oils.

The polymers produced by the present process can be subjected to chemical modifying treatments, such as halogenation, halogenation followed by dehalogenation, sulfohalogenation by treatment with sulfuryl chloride or mixtures of chlorine and sulfur dioxide, sulfonation and other reactions to which hydrocarbons may be subjected. The polymers of our invention can also be irradiated by high energy X-rays (about 0.5 to 2.5 mev. or more) or by radioactive materials to effect cross-linking, increase in softening temperature and the like.

We claim:

1. A process for producing a normally solid polymer which comprises contacting ethylene with an inert liquid reaction medium containing a catalyst prepared by mixing (a) a member of the group consisting of alkali metals and akaline earth metals
   and
   (b) an aluminum halide selected from the group consisting of aluminum trichloride, aluminum tribromide and aluminum chlorobromides the amount of (a) being between 1 and about 30 chemical equivalents per mole of aluminum halide with (c) a supported catalyst comprising essentially a minor proportion of an oxide of a metal selected from the class consisting of group 5a and group 6a of the periodic table and mixtures thereof extended upon a major proportion of an inert solid supporting material comprising a difficultly reducible metal oxide the weight ratio of (a) plus (b) to (c) being in the range of from about 0.01 to about 5.0, said supported catalyst being present in an operative amount between about 0.001% and about 20% by weight based on the weight of ethylene, effecting such contacting under superatmospheric pressure at a suitable polymerization temperature between about 20° C. and about 250° C. and recovering said normally solid polymer so produced.

2. The process of claim 1 wherein said oxide catalyst is partially pre-reduced before use.

3. In a polymerization process, the steps of contacting ethylene under polymerization conditions including a temperature between about 30° C. and about 175° C. and a pressure between about atmospheric and 1000 p.s.i.g. with an inert liquid reaction medium containing a catalyst prepared by mixing:

(a) a member of the group consisting of alkali metals and alkaline earth metals
   (b) aluminum trichloride the equivalents ratio of (a) to (b) being between 1 and about 10 with (c) a supported catalyst comprising essentially a minor proportion of an oxide of a metal of group 5a of the periodic table extended upon a major proportion of an inert solid supporting material comprising a difficultly reducible metal oxide the weight ratio of (a) plus (b) to (c) being in the range of from about 0.01 to about 5.0, said supported catalyst being present in an operative amount between about 0.001% and 20% by weight based on the weight of ethylene and recovering said normally solid polymer so produced.

4. A suspension polymerization process according to claim 3 wherein polymerization is effected at a temperature between about 50° C. and about 125° C.

5. The process of claim 3 wherein said supported oxide is an oxide of vanadium.

6. In a polymerization process, the steps of contacting ethylene under polymerization conditions including a temperature between about 30° C. and about 175° C. and a pressure between about 0 and 1000 p.s.i.g. with an inert liquid reaction medium containing a catalyst prepared by mixing (a) a member of the group consisting of alkali metals and alkaline earth metals
   (b) aluminum trichloride the equivalents ratio of (a) to (b) being between 1 and about 10 with (c) a supported catalyst comprising essentially a minor proportion of an oxide of a metal of group 6a of the periodic table extended upon a major proportion of an inert solid supporting material comprising a difficulty reducible metal oxide the weight ratio of (a) plus (b) to (c) being in the range of from about 0.01 to about 5.0, said supported catalyst being present in an operative amount between about 0.001% and 20% by weight based on the weight of ethylene and recovering said normally solid polymer so produced.

7. A suspension polymerization process according to claim 6 wherein polymerization is effected at a temperature between about 50° C. and about 125° C.

8. The process of claim 6 wherein said oxide is an oxide of molybdenum and said polymerization process is conducted at a temperature of from about 50° to about 150° C.

9. A process for the homopolymerization of ethylene to a normally solid resinous polymer which comprises contacting ethylene in a liquid hydrocarbon reaction medium with a catalyst prepared by mixing sodium, aluminum chloride and a supported catalyst comprising essentially a minor proportion of an oxide of vanadium extended upon a major proportion of a difficultly reducible metal oxide, the equivalents ratio of sodium to aluminum chloride being from about 1 to about 10, the weight ratio of sodium and aluminum chloride to said supported catalyst being in the range of from about 0.01 to about 5.0, continuing said contacting at a temperature between about 50° C. and about 150° C. until said polymer has formed, and recovering a resinous polymer so produced.

10. A process for the homopolymerization of ethylene to a normally solid resinous polymer which comprises contacting ethylene in a liquid hydrocarbon reaction medium with a catalyst prepared by mixing lithium, aluminum chloride and a supported catalyst comprising essentially a minor proportion of an oxide of molybdenum extended upon a major proportion of a difficultly reducible metal oxide, the equivalents ratio of lithium to aluminum chloride being from about 1 to about 10, the weight ratio of lithium and aluminum chloride to said supported catalyst being in the range of from about 0.01 to about 5.0, continuing said contacting at a temperature between about 50° C. and about 150° C. until said polymer has formed, and recovering a resinous polymer so produced.

11. A novel composition consisting essentially of the reaction product secured by admixing (a) a member of the group consisting of alkali metals and alkaline earth metals
(b) aluminum trichloride the amount of (a) being between 1 and about 10 chemical equivalents per mole of aluminum trichloride with (c) a supported catalyst comprising essentially a minor proportion of an oxide of a metal of group 5a of the periodic table extended upon a major proportion of an inert solid supporting material comprising a difficultly reducible metal oxide.

the weight ratio of (a) plus (b) to (c) being in the range of from about 0.01 to about 5.0.

12. A novel composition consisting essentially of the reaction product secured by admixing (a) a member of the group consisting of alkali metals and alkaline earth metals
(b) aluminum trichloride the amount of (a) being between 1 and about 10 chemical equivalents per mole of aluminum trichloride with (c) a supported catalyst comprising essentially a minor proportion of an oxide of a metal of group 6a of the periodic table extended upon a major proportion of an inert solid supporting material comprising a difficultly reducible metal oxide the weight ratio of (a) plus (b) to (c) being in the range of from about 0.01 to about 5.0.

References Cited in the file of this patent
UNITED STATES PATENTS

| | | |
|---|---|---|
| 2,691,647 | Field et al. | Oct. 12, 1954 |
| 2,726,234 | Field et al. | Dec. 6, 1955 |
| 2,795,574 | Feller et al. | June 11, 1957 |
| 2,824,089 | Peters et al. | Feb. 18, 1958 |
| 2,846,427 | Findlay | Aug. 5, 1958 |